Aug. 22, 1967       C. L. FOOTE, JR., ET AL.       3,336,962
THREADED NUT LOCK
Filed April 5, 1966                    2 Sheets-Sheet 1

Inventors,
Charles L. Foote Jr.
Edward A. Knowlton &
William D. Batterson
by Walter S. Jones
Atty Aug. 22, 1967
C. L. FOOTE, JR., ET AL
3,336,962
THREADED NUT LOCK
Filed April 3, 1966
2 Sheets-Sheet 2
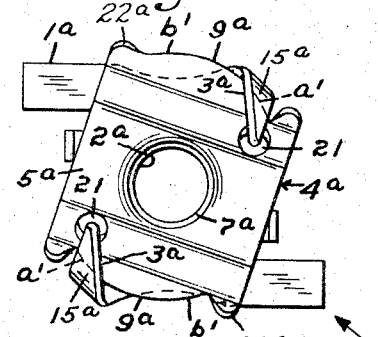
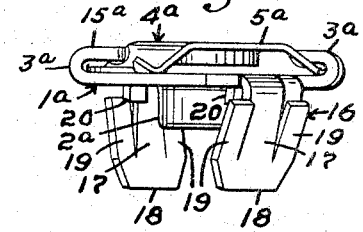
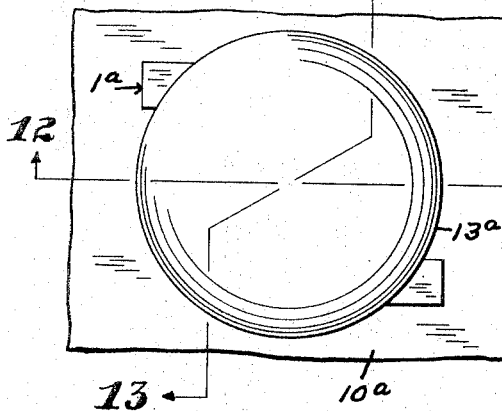
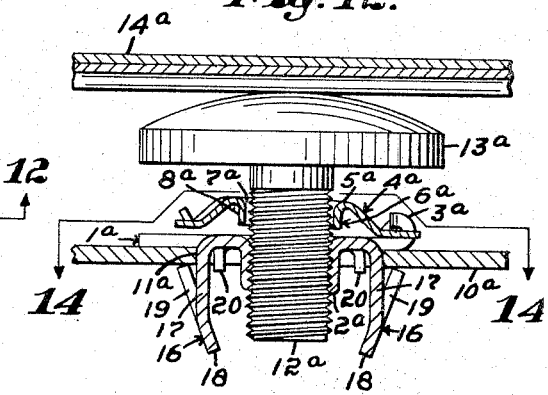
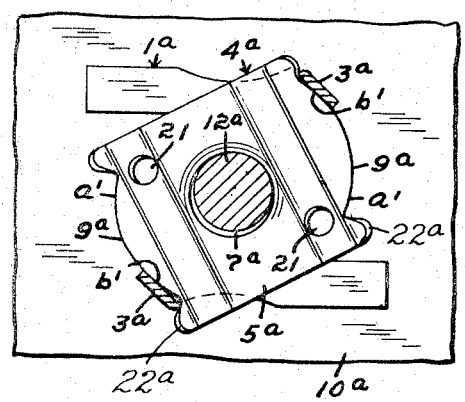
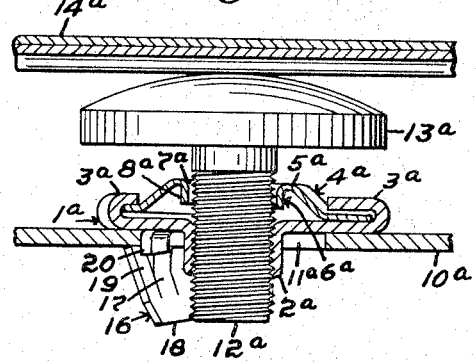
Inventors.
Charles L. Foote Jr.
Edward A. Knowlton &
William D. Batterson
by James R O'Connor Atty.

United States Patent Office 3,336,962
Patented Aug. 22, 1967

3,336,962
THREADED NUT LOCK
Charles L. Foote, Jr., Franklin Village, Mich., Edward A. Knowlton, Winchester, Mass., and William D. Batterson, Grand Blanc, Mich.; said Foote and said Knowlton assignors to United-Carr Incorporated, Boston, Mass., a corporation of Delaware; said Batterson assignor to General Motors Corporation, Detroit, Mich., a corporation of Delaware
Filed Apr. 3, 1966, Ser. No. 552,659
10 Claims. (Cl. 151—19)

The present application is a continuation in part of application Ser. No. 338,030 filed Jan. 16, 1964, now abandoned.

The invention, as illustrated and described herein, relates to a nut lock device designed to prevent accidental loosening of a nut relative to a bolt.

One object of the invention is to provide a simple threaded nut lock device that includes a threaded nut of any suitable construction and an associated locking member assembled therewith and having a bolt engaging portion adapted to be engaged with an disengaged from a bolt by relative movement between the nut and the locking member by co-operating elements presented partly by the nut and partly by the locking member; the co-operating elements being movable relative to each other.

Another object of the invention is to provide a two-piece threaded nut locking device that may be locked in position upon a bolt by a rotary cam construction arranged between the two pieces.

A further object of the invention is to provide a device that includes the improved nut lock device attached to a support and engageable with an adjustable threaded foot or like member whereby the threaded foot may be adjusted relative to the support and held in adjusted locked position.

A still further object of the invention is to provide an improved nut lock device having snap fastener means for rapidly and securely attaching said device to an apertured support.

Other objects and advantages of the invention will become evident from a reading of the following detailed description in conjunction with a viewing of the accompanying drawing in which:

FIG. 9 is a plan view of a second form of the nut lock device prior to assembly with a threaded member;

FIG. 10 is an edge view of the device shown in FIG. 9 looking in the direction of the arrow shown therein with the upper right hand corner of the locking member broken away;

FIG. 11 is a plan view of an installation depicting the nut lock device of FIG. 10 attached to an apertured support and with an adjustable screw member threaded into the device;

FIG. 12 is a section taken on line 12—12 of FIG. 11 depicting a portion of a supported member and the locking member of the device in the locked position;

FIG. 13 is a section taken on line 13—13 of FIG. 11 also depicting a portion of a supported member and the locking member in the locked position; and FIG. 14 is a section taken on line 14—14 of FIG. 12.

Figure 6:
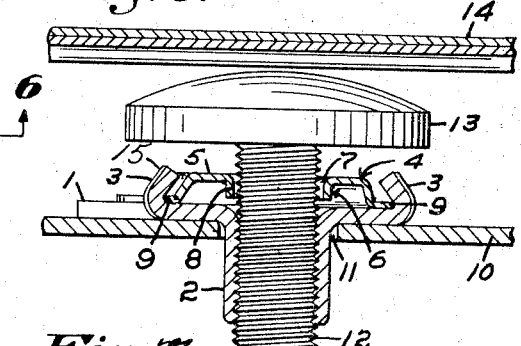
FIG. 6 is a section taken on line 6—6 of FIG. 5 with a portion of the second support, the device being shown in the unlocked position.

The particular threaded nut lock device illustrated in the drawings was selected because it is simple, easy to construct, easy to operate and positive in its locking action. The device shown in FIGS. 1-8 includes a sheet metal nut member having a base portion 1, a tubular internally threaded barrel portion 2, and a pair of opposed relatively stiff fingers 3—3 integral with and extending upwardly from the base portion 1. The device also includes a relatively thin, flexible locking member 4 of sheet metal shown as generally rectangular in form and having a raised central portion 5 from which extends a barrel portion 6 providing an aperture 7 surrounded by a bolt engaging wall 8, as best illustrated in FIG. 6. The locking member 4 rests upon the base portion 1 of the nut member and is held in assembly therewith by the fingers 3—3 which extend from the side of the base opposite the barrel portion 2 and which are bent toward each other to overlie the arcuate cam-shaped edges 9—9 of the locking member 4. The fingers 3—3 present a plurality of upper-generally planar facing surfaces 15. The distance across the internal surfaces of the fingers 3 adjacent the base 1 is fixed and remains constant As viewed in FIGS. 1 and 2 the left cam edge 9 of the locking member 4 may generally be termed the "locking" edge and the right edge the "following" edge. The distance from the center of the aperture 7 to the portion of the "locking" edge designated b is greater than the distance from the center of the aperture to the portion of the same edge designated a. Conversely, the distance from the center of the aperture 7 to the portion b of the "following" edge is less than the distance from the center to portion a of the same edge. The distance from the center to each of the edge portions a—a being essentially although not necessarily equal.

The edge portions a—a generally loosely abut the internal surfaces of the fingers 3 adjacent the base 1. In the unlocked position shown in FIGS. 1, 2 and 6 the aperture 7 and the barrel portion 2 are axially aligned for unimpeded receipt of a threaded bolt or screw member.

Figure 7:
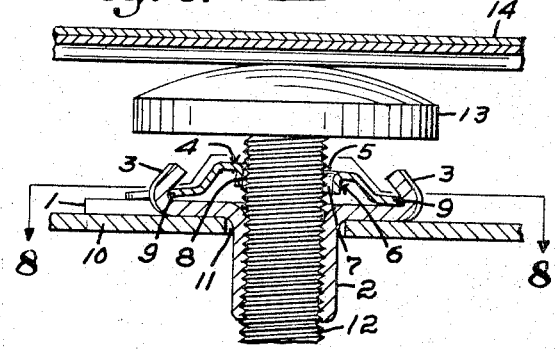
FIG. 7 is a view similar to FIG. 6 with the parts shown in the locked position.

When the device is used in an installation, such as shown in FIGS. 5, 6, 7 and 8, the nut member may be spot welded or otherwise secured to a metal support 10 with the barrel portion 2 extending through a hole 11 (FIG. 6) and a screw member 12 is threaded into the barrel portion 2, as shown in FIGS. 6 and 7.

In the specific installation shown there is represented a motor vehicle hood leveling screw 12 having a head 13 of soft rubber or plastic that supports the hinged hood 14 (FIGS. 6 and 7). Since the support 10, in this illustration, indicates a portion of the motor vehicle body, a plurality of the devices may be so arranged on the support 10 that they will support the hood 14 at predetermined spaced distances so that when the hood is closed the soft heads 13 will bear against the underside of the hood. Thus these devices may be used to level an engine hood (which in modern motor vehicles is of relatively large size) to take up irregularities and also prevent noises.

Figure 1:
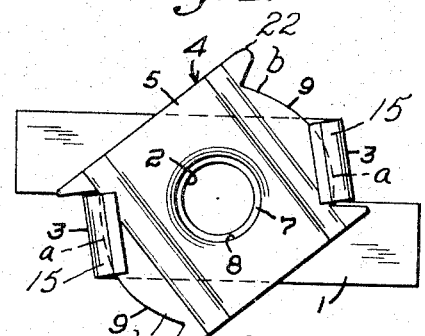
FIG. 1 is a plan view of one form of the nut lock device before assembly with a threaded member.
Figure 2:
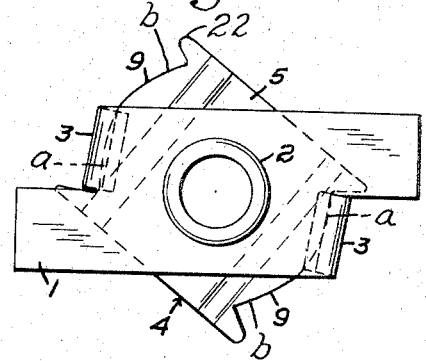
FIG. 2 is a bottom plan view of the device shown in FIG. 1.
Figure 3:
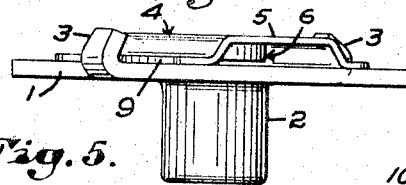
FIG. 3 is an edge view of the nut lock device shown in FIG. 1.
Figure 4:
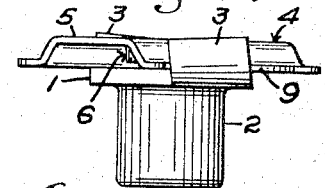
FIG. 4 is an edge view of the device shown in FIG. 3 as viewed from the right hand side thereof.
Figure 5:
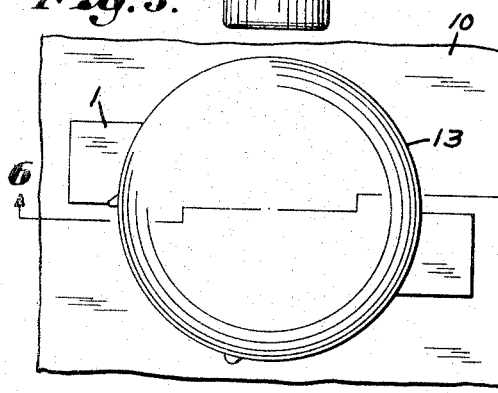
FIG. 5 is a plan view of an installation of the nut lock device of the invention attached to a support and with an adjustable screw member threaded into the nut lock device.
Figure 8:
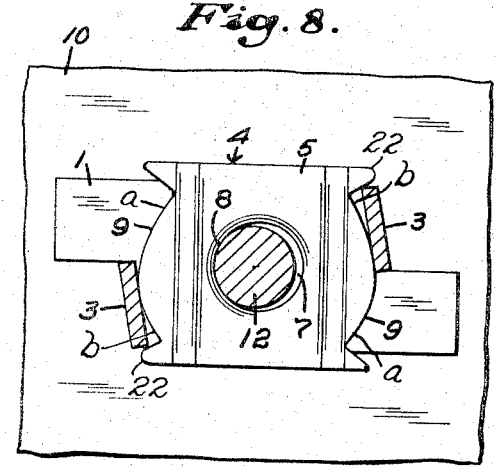
FIG. 8 is a plan section taken on line 8—8 of FIG. 7.

After the proper adjustments of the screws are made a suitable tool, such as a wrench, may engage the edges of the locking member 4 and it may be rotated relative to the base portion 1 of the nut member from a position shown in FIG. 1 to a position shown in FIG. 8 whereby the wall 8 in the barrel portion 6 of the locking member is forced tightly against the threads of the screw member 12, as shown in FIG. 7.

When the locking member is rotated the portions b—b of the "locking and following" cam edges 9—9 are brought into tight, abutting engagement with the internal surfaces of the opposed fingers 3 and, due to the dimensional relationship between the center of the aperture and the said cam edge portions previously set forth, the center of the aperture 7 is shifted out of alignment with the axis of the barrel portion 2 and the locking member 4 is placed in interference with the threaded screw 12. Moreover, since the overall distance across the edge portions b—b is greater than the distance across the internal surfaces of the fingers 3 adjacent the base 1, the locking member 4 is bowed upwardly and thereafter maintains a tension which prevents relative rotation between the nut and the locking member when the installation is subjected to vibration. The diagonally opposite stop tabs 22 which extend outwardly from the locking member adjacent the ends of the cam edges bear against the fingers 3 when the locking member is in the locked and unlocked positions and thus limit the angle through which the locking member may be rotated. It should also be noted that while the locking member 4 exerts sufficient tension on the bolt to prevent its rotation the force is not so great as to cause damage to the bolt threads.

The construction and operation of the upper portion of the device shown in FIGS. 9—14 are generally identical to the device shown in FIGS. 1—8. However, it should noted that the raised portion 5a of the locking member 4a has a pair of diagonally opposed openings 21 in which the free ends of the tapered fingers 3a seat when the locking member 4a is in the unlocked position to prevent the locking member from accidentally moving from said position and to provide for proper axial alignment of the opening 7a with the barrel portion 2a. Further, the fingers 3a, which are substantially longer and narrower than those of FIGS. 1–8, have a transverse arcuate sweep adjacent the base 1a closely conforming to the arcuate edge portions b'—b' whereby said fingers tightly abut said edge portions across the full width of the fingers when the locking member 4a is in the locked position as best viewed in FIG. 14. In addition the fingers 3a have been curled over to such a degree that their upper surfaces 15a are generally parallel to the base 1a.

The most important modification incorporated in the latter form of the invention is the addition of the snap acting legs 16 which provide for rapid and secure attachment of the nut lock device to the apertured support 10a. The legs 16 are integrally connected to the base 1a by a central portion 17 which curls downwardly from the base and is disposed in spaced, generally parallel relationship to the barrel portion 2a. The lower free ends 18 of the legs are turned inwardly toward each other. Each of the legs 16 has a pair of sheared tabs 19 which extend from the ends 18 angularly outwardly and upwardly toward the base 1a on each side of the central portion 17. In addition a plurality of short lugs 20 extend downwardly from the base 1a between the barrel portion 2a and the upper free ends of the sheared tabs 19.

FIGS. 11–14 depict an installation wherein the nut lock device is secured to a support 10a having a rectangular opening 11a. The assembly is accomplished easily and extremely rapidly by simply threading the bolt 12 into the nut lock device with the member 4a in the unlocked position, aligning the legs 16 with the opening 11a and then manually pressing on the head 13a to force the legs through the opening with the inturned ends 18 providing a lead-in. As the legs pass through the opening the sheared tabs 19 are initially pinched inwardly until their upper free ends clear the underside of the support, whereupon they spring outwardly to the position shown in FIGS. 12 and 13. Since the inner edge of the free ends of each of the tabs 19 is spaced from the base 1a, a distance equal to the thickness of the support 10a, the co-operative engagement results in a secure locking of the nut lock device to the support. Further, the central portion 17 of each of the legs abuts the end walls defining the opening 11a to prevent any lateral shifting of the device and the lugs 20 engage the side walls defining the opening to prevent rotation of the device with respect to the support. Thus the attachment of the device to the support, and the adjustment and locking of the leveling bolt may be accomplished on an assembly line in a matter of a few seconds.

Two variations of the nut lock device have been illustrated and described in connection with an adjustable leveling device for motor vehicle hoods. However, it should be understood that a similar nut locking construction can be used in any combination of elements where it is desirable to have a screw or bolt adjustable relative to a nut member and yet maintain an adjusted position even when used in combinations of elements where vibration or a scuffing action which might have a tendency to rotate an unlocked adjustable screw are present. Thus while there has been illustrated and described a simple, inexpensive nut lock device, it should be understood that further variations in the construction thereof and in the shape of the opening in the supporting member may be made within the scope of the invention which is best defined by the following claims.

We claim:

1. A threaded nut locking device comprising in combination, a nut member having a generally flat, laterally enlarged base portion, a threaded barrel portion extending from one side of said base portion, opposed fingers extending from the side of said base portion opposite said barrel portion and a cooperating, relatively thin, flexible locking member assembled with said nut member adjacent said base portion and held in place by portions of said opposed fingers which overlie said locking member, said locking member being rotatable relative to said nut member and having an aperture surrounded by a bolt engaging wall, the center of said aperture and said barrel portion being axially aligned when said locking member is in one relative position with respect to said nut member to allow for insertion of a bolt into said nut member, said locking member having first opposed cam edge portions spaced a given distance from the center of said aperture and located adjacent said fingers when said locking member is in said one relative position and second opposed cam edges one of which is spaced a greater distance from the center of said aperture than said first cam edges and another of which is spaced a lesser distance from the center of said aperture than said first cam edges whereby the center of said aperture is shifted out of alignment with the axis of said barrel portion and said wall is forced into engagement with a bolt responsive to the rotation of said locking member to a second relative position with respect to said nut member, the distance between said second cam edges being greater than the distance between said fingers adjacent thereto when said locking member is in the last mentioned relative position with respect to said nut member, whereby said locking member is flexed upwardly and placed in tension to prevent accidental rotation thereof with respect to said nut member.

2. A threaded nut locking device according to claim 1 wherein said fingers present upper, generally planar, facing surfaces.

3. A threaded nut locking device according to claim 1 wherein said locking member has a plurality of spaced openings in which portions of said fingers seat when said locking member is in the second relative position with respect to said nut member to prevent accidental movement of said locking member when the latter is in said position.

4. A threaded nut locking device according to claim 1 wherein portions of said fingers are spaced from and generally parallel to said base portion.

5. A threaded nut locking device according to claim 1 including a plurality of snap acting legs for securing said device to an apertured support, said legs being integral with said base portion and extending from the same side of said base portion as said barrel portion in spaced relationship to said barrel portion.

6. A threaded nut locking device according to claim 5 including a plurality of spaced lugs extending from said base portion between said barrel portion and said legs, said lugs being adapted to engage the internal edges of an apertured support to prevent rotation of the device with respect to a support.

7. A threaded nut locking device according to claim 5 wherein said snap acting legs have inturned free ends providing a lead-in to the aperture in a support and a plurality of support engaging tabs extending from said free ends angularly outwardly and toward said base portion and terminating adjacent said base portion.

8. A threaded nut locking device according to claim 7 wherein the termination of each of said tabs is spaced from said base portion a distance approximately equal to the thickness of the support to which the nut locking device is to be secured.

9. A threaded nut locking device comprising, in combination, a nut member having a generally flat, laterally enlarged base portion and a threaded barrel portion extending from one side of said base portion, a locking member assembled with said nut member at the surface of said base portion remote from said barrel portion and secured to said base portion by locking member retaining means which extend from said base portion at the side thereof remote from said barrel portion and overlie portions of said locking member, said locking member being rotatable relative to said nut member against said locking member retaining means and having an aperture surrounded by a bolt engaging wall for locking the nut to a bolt against accidental unfastening, said locking member having opposed cam edge portions adapted to cooperate with said locking member retaining means to move said bolt engaging wall into tensioned engagement with a bolt responsive to rotation of said locking member to one relative position with respect to said nut member, and a plurality of stop tabs extending outwardly from said locking member adjacent the ends of said opposed cam edges to engage said locking member retaining means and limit the extent of rotation of said locking member with respect to said nut member, the distance between said opposed cam edge portions which are in engagement with said locking member retaining means when said locking member is in said one relative position being greater than the distance between the engaging portions of said retaining means whereby said locking member is flexed upwardly away from said base portion and placed in tension to prevent accidental unfastening of the bolt.

10. A threaded nut locking device comprising, in combination, a nut member having a base portion and a threaded barrel portion extending from one side of said base portion, a locking member assembled with said nut member adjacent said base portion and secured to said base portion by locking member retaining means which extend from said base portion at the side thereof remote from said barrel portion and overlie portions of said locking member, said locking member being rotatable relative to said nut member against said locking member retaining means and having an aperture surrounded by a bolt engaging wall for locking the nut to a bolt against accidental unfastening, said locking member having first opposed cam edge portions spaced a given distance from the center of said aperture and located adjacent said locking member retaining means when said locking member is in one relative position with respect to said nut member and second opposed cam edges, one of which is spaced a greater distance from the center of said aperture than said first cam edges, and another of which is spaced a lesser distance from the center of said aperture than said first cam edges whereby the center of said aperture is shifted laterally and said wall is forced into engagement with a bolt responsive to rotation of said locking member to a second relative position with respect to said nut member, the distance between said second cam edges being greater than the distance between said locking member retaining means adjacent thereto when said locking member is in the last mentioned relative position with respect to said nut member, whereby said locking member is flexed upwardly and placed in tension to prevent accidental rotation thereof with respect to said nut member, said locking member having a plurality of stop tabs extending outwardly thereof adjacent the ends of said opposed cam edges to engage said locking member retaining means and limit the extent of rotation of said locking member with respect to said nut member.

References Cited

UNITED STATES PATENTS

| | | | |
|---|---|---|---|
| 1,124,388 | 1/1915 | Bolton | 151—19 |
| 1,125,067 | 1/1915 | Cook | 151—19 |
| 1,281,709 | 10/1918 | Thomassen | 151—19 |
| 2,687,862 | 8/1954 | Crowther | 151—41.75 |

FOREIGN PATENTS

| | | |
|---|---|---|
| 948,673 | 1/1949 | France. |
| 900,159 | 12/1953 | Germany. |
| 564,677 | 10/1944 | Great Britain. |

CARL W. TOMLIN, *Primary Examiner.*

M. PARSONS, JR., *Assistant Examiner.*